United States Patent [19]
Guest

[11] Patent Number: 5,779,284
[45] Date of Patent: Jul. 14, 1998

[54] TUBE COUPLING BODIES HAVING RESILIENT FINGERS SPACED FROM THE GROOVE WALL

[76] Inventor: John Derek Guest, 'Iona', Cannon Hill Way, Bray, Maidenhead, Berkshire SL6 2EX, United Kingdom

[21] Appl. No.: 669,086

[22] Filed: Jun. 24, 1996

[30]  Foreign Application Priority Data

Jun. 26, 1995 [GB] United Kingdom ............... 9512974

[51] Int. Cl.⁶ .................................................. F16L 37/12
[52] U.S. Cl. ........................................... 285/322; 285/340
[58] Field of Search ................................. 285/340, 322, 285/323

[56] References Cited

U.S. PATENT DOCUMENTS

| | | | |
|---|---|---|---|
| 3,653,689 | 4/1972 | Sapy et al. | 285/323 |
| 3,743,326 | 7/1973 | Courtot et al. | 285/323 |
| 3,999,783 | 12/1976 | Legris | 285/323 |
| 4,606,783 | 8/1986 | Guest | 285/323 |
| 4,645,246 | 2/1987 | Guest | 285/323 |
| 4,722,560 | 2/1988 | Guest | 285/323 |
| 5,085,472 | 2/1992 | Guest | 285/322 |
| 5,230,539 | 7/1993 | Olson | 285/323 |

*Primary Examiner*—Eric K. Nicholson
*Attorney, Agent, or Firm*—Baker & Daniels

[57] ABSTRACT

The disclosure relates to a tube coupling body having a throughway open at one end to receive a tube and an insert sleeve to fit in the throughway adjacent the open end with one end of the sleeve located within the throughway and the other end at the end open of the throughway. The insert sleeve has a tapered internal cam surface reducing towards said other end of the sleeve with which fingers of a tube gripping collet are engageable to receive and lock a tube inserted into the throughway in the coupling body. The external surface of the sleeve has an annular groove with a metal grab ring embedded in the sleeve adjacent the side of the groove nearest said one end of the sleeve and having multiple teeth around its outer periphery projecting radially beyond the outer surface of the sleeve. On insertion of the sleeve in the throughway, the resilient teeth are angled towards said other end of the sleeve by engagement with the surface of the throughway, the angling of the fingers being accommodated by the annular groove and the resilience of the teeth causes the teeth to grip with the surface of the throughway to prevent the insert sleeve from being withdrawn from the throughway.

9 Claims, 1 Drawing Sheet

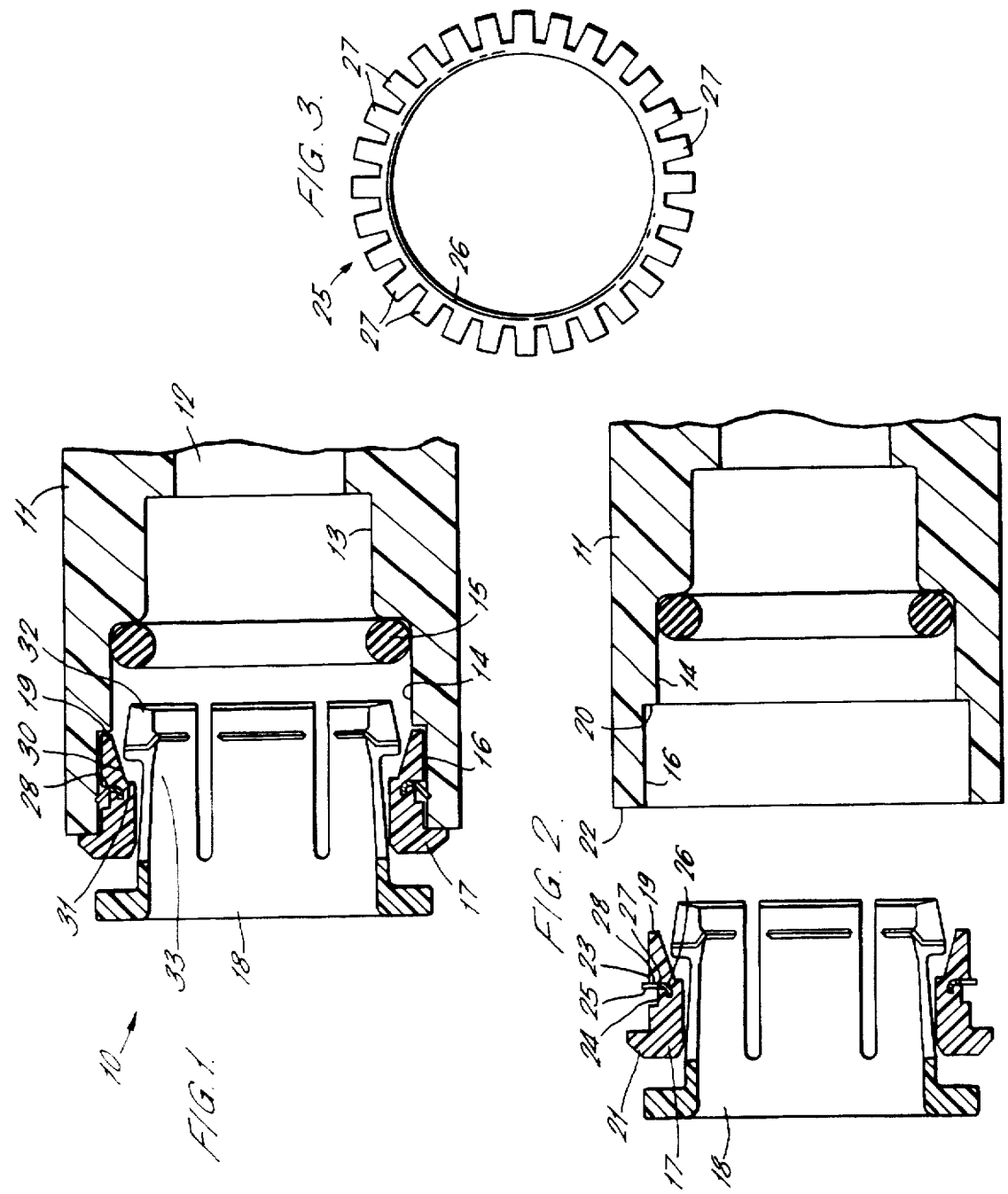

TUBE COUPLING BODIES HAVING RESILIENT FINGERS SPACED FROM THE GROOVE WALL

BACKGROUND OF THE INVENTION

1. Field of the Invention

This invention relates to tube coupling bodies of the type in which an open ended throughway has a resilient fingered collet to receive and hold an end portion of a tube inserted into the throughway.

2. Background of Prior Art

My UK Patent Specification No 2172948 describes and illustrates a tap or valve body having a throughway to receive a tube which is locked in the throughway and is sealed to the bore by O-ring seals. The collet is encircled by an insert sleeve which is locked in the throughway by means of a collet having a plurality of resilient fingers. The collet is encircled by a plastics insert sleeve located in a counterbore at the end of the throughway and held therein by a spring ring embedded in the sleeve with an outwardly angled outer periphery to engage and grip the surface of the counterbore.

The angled outer periphery of the spring ring is almost entirely embedded in the insert sleeve which resists deflection of the ring as it is inserted into the counterbore. As a result, if the coupling body is formed on a soft plastics material, this is likely to be damaged on insertion of the sleeve reducing the effectiveness of the grip of the spring ring with the surface of the counterbore.

SUMMARY OF THE INVENTION

This invention provides a tube coupling body having a throughway open at one end to receive a tube and an insert sleeve to fit in the throughway adjacent the open end with one end of the sleeve located within the throughway and the other end at the end open of the throughway, the insert sleeve having a tapered internal cam surface reducing towards said other end of the sleeve with which fingers of a tube gripping collet are engageable to receive and lock a tube inserted into the throughway in the coupling body, the external surface of the sleeve having an annular groove and a metal grab ring embodied in the sleeve adjacent the side of the groove nearest said one end of the sleeve and having multiple fingers around its outer periphery projecting radially beyond the outer surface of the sleeve so that on insertion of the sleeve in the throughway, the resilient fingers are angled towards the other end of the sleeve by engagement with the surface of the throughway, the angling of the fingers being accommodated by the annular groove and the resilience of the fingers causing the fingers to grip with the surface of the throughway to prevent the insert sleeve from being withdrawn from the throughway.

Preferably the sleeve has an outwardly projecting encircling flange at said other end thereof which engages with the end face of the coupling body around the open end of the throughway to limit inserting of the sleeve into the throughway.

More specifically the throughway may be formed with a counterbore,adjacent said open end in which the sleeve is engageable terminating in a shoulder with which said one end of the sleeve is engageable on insertion of the sleeve into the throughway.

In any of the above arrangement the sleeve may have an external diameter corresponding to the internal diameter of the throughway and said annular groove is formed in the external surface of the sleeve midway along the sleeve.

Also in any of the above arrangement the tapered cam surface may start at said one end of the sleeve and terminates part way along the sleeve in an annular step for engagement with heads at the free ends of the collet fingers to resist withdrawal of the collet from the sleeve.

BRIEF DESCRIPTION OF THE DRAWINGS

FIG. 1 is an assembly view of a tube coupling including a coupling body having a throughway for receiving a tube and an insert sleeve mounted in the throughway which a collet is locatable for receiving and looking a tube in the throughway;

FIG. 2 is a similar to view to FIG. 1 showing insert sleeve and collet prior to insertion in the coupling body; and FIG. 3 is a end view of a grab ring embodied in the insert sleeve of the sleeve in the coupling body.

DESCRIPTION OF THE PREFERRED EMBODIMENTS

Referring firstly to FIG. 1 of the drawings, there is shown a tube coupling indicated generally at 10 and comprising a moulded plastics tube coupling body 11 having an open ended throughway 12 in which a tube end is engageable. Towards the open end of the throughway, the throughway is formed with a series of stepped counterbores comprising a first counterbore 13 providing an annular seat in which an end of a tube to be held in the coupling body is located, a second counterbore 14 in which an O ring seal 15 is mounted for sealing with the external surface of the tube and a third counterbore 16 at the open end of the throughway in which an insert sleeve 17 is mounted and in which a resilient fingered collet 18 is located to receive and grip the tube.

Reference is now made to FIG. 2 which illustrates the insert sleeve 17 and collet 18 prior to insertion in the counterbore 16 in the coupling body. To locate the sleeve, it is formed with out-turned flange 21 to engage the end face 22 of the coupling body 11. Between the end face 19 and flange 21, the insert sleeve has a cylindrical outer surface 23 which is a close fit in counterbore 16. Midway along the surface there is an annular rectangular section groove 24 and a grab ring 25 is embedded in the insert sleeve on the side of the groove 24 adjacent the side 28 of the groove nearest end face 19 of the sleeve. The grab ring has a inner L-section annular portion 26 and a multiplicity of radial teeth 27 closely spaced around the annular portion. The grab ring is elevation in FIG. 3.

Prior to insertion of the insert sleeve 17 into the counterbore 16, the teeth 27 of the grab lie adjacent the side 28 of the groove nearest end 19 of the insert sleeve on forcing the insert sleeve 17 into the counterbore 16, the teeth 25 are flexed by engagement with the surface of the counterbore away from the side 28 of the groove into the groove as shown in FIG. 1 and the resilience of the teeth holds the teeth firmly against the counterbore to resist extraction of the insert sleeve.

The inner side of the insert sleeve is formed with a tapered cam surface 30 extending from end 19 of the sleeve and terminating in an annular step 31 facing into the throughway. The tapered cam surface is engageable with heads 32 at the ends of resilient fingers 33 of the collet 18 to deflect the fingers inwardly as the collet is moved outwardly of the insert sleeve to cause the collet fingers to grip and engage a tube extending through the collet. The shoulder 31 at the reduced diameter end of the cam surface 30 provides a stop with which the head 32 are engageable when a tube is present in the collet to prevent inadvertent extraction of the collet from the coupling body.

I claim:

1. A tube coupling body having a throughway open at one end to receive a tube and an insert sleeve to fit in the throughway adjacent the open end with one end of the sleeve located within the throughway and the other end at the open end of the throughway, the insert sleeve having a tapered internal cam surface reducing towards said other end of the sleeve with which fingers of a tube gripping collet are engageable to receive and lock a tube inserted into the throughway in the coupling body, the external surface, of the sleeve having an annular groove which has one side nearest said one end of said sleeve, and a metal grab ring embodied in the sleeve, said grab ring having multiple resilient fingers around an outer periphery of said grab ring projecting radially beyond the outer surface of the sleeve and adjacent said one side of said groove so that on insertion of the sleeve into the throughway, the resilient fingers are flexed and spaced away from said one side of said groove and are thereby angled towards the other end of the sleeve by engagement with a surface of the throughway, the flexing of the fingers being accommodated by the annular groove and the resilience of the fingers causing the fingers to grip said surface of the throughway to prevent the insert sleeve from being withdrawn from the throughway.

2. A tube coupling body as claimed in claim 1, wherein the sleeve has an outwardly projecting encircling flange at said other end thereof which engages with the end face of the coupling body around the open end of the throughway to limit inserting of the sleeve into the throughway.

3. A tube coupling body as claimed in claim 1, wherein the throughway is formed with a counterbore adjacent said open end in which the sleeve is engageable terminating in a shoulder with which said one end of the sleeve is engageable on insertion of the sleeve into the throughway.

4. A tube coupling body as claimed in claim 1, wherein the sleeve has an external diameter corresponding to the internal diameter of the throughway and said annular groove is formed in the external surface of the sleeve midway along the sleeve.

5. A tube coupling as claimed in claim 1, wherein the tapered cam surface starts at said one end of the sleeve and terminates part way along the sleeve in an annular step for engagement with heads at the free ends of the collet fingers to resist withdrawal of the collet from the sleeve.

6. A tube coupling body as claimed in claim 2, wherein the sleeve has an external diameter corresponding to the internal diameter of the throughway and said annular groove is formed in the external surface of the sleeve midway along the sleeve.

7. A tube coupling body as claimed in claim 3, wherein the sleeve has an external diameter corresponding to the internal diameter of the throughway and said annular groove is formed in the external surface of the sleeve midway along the sleeve.

8. A tube coupling as claimed in claim 2, wherein the tapered cam surface starts at said one end of the sleeve and terminates part way along the sleeve in an annular step for engagement with heads at the free ends of the collet fingers to resist withdrawal of the collet from the sleeve.

9. A tube coupling as claimed in claim 3, wherein the tapered cam surface starts at said one end of the sleeve and terminates part way along the sleeve in an annular step for engagement with heads at the free ends of the collet fingers to resist withdrawal of the collet from the sleeve.

* * * * *